United States Patent
Wang et al.

(10) Patent No.: US 10,437,741 B2
(45) Date of Patent: Oct. 8, 2019

(54) LOADING CONTROL METHOD AND SYSTEM STORAGE DEVICE

(71) Applicant: MEIBEIKE (SHENZHEN) TECHNOLLOGY CO., LTD, Shenzhen (CN)

(72) Inventors: Zhizhang Wang, Shenzhen (CN); Donghai Chen, Shenzhen (CN); Bo Xiao, Shenzhen (CN); Hui Wang, Shenzhen (CN)

(73) Assignee: MEIBEIKE (SHENZHEN) TECHNOLLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/675,491

(22) Filed: Aug. 11, 2017

(65) Prior Publication Data
US 2017/0364453 A1 Dec. 21, 2017

Related U.S. Application Data

(63) Continuation of application No. PCT/CN2016/072749, filed on Jan. 29, 2016.

(30) Foreign Application Priority Data

Feb. 11, 2015 (CN) .......................... 2015 1 0071057

(51) Int. Cl.
*G06F 12/14* (2006.01)
*G06F 13/16* (2006.01)
(Continued)

(52) U.S. Cl.
CPC .......... *G06F 12/1466* (2013.01); *G06F 13/16* (2013.01); *G06F 13/364* (2013.01);
(Continued)

(58) Field of Classification Search
CPC .... G06F 13/16; G06F 13/364; G06F 12/1466; G06F 12/4286; G06F 21/44; G06F 21/62; G06F 21/78; G06F 21/85
(Continued)

(56) References Cited

U.S. PATENT DOCUMENTS

| 2009/0319716 | A1 | 12/2009 | Nagadomi | |
| 2014/0164774 | A1* | 6/2014 | Nord ..................... | G06F 21/602 |
| | | | | 713/171 |
| 2015/0039910 | A1* | 2/2015 | Card ....................... | G09C 1/00 |
| | | | | 713/193 |

FOREIGN PATENT DOCUMENTS

| CA | 1512365 A | 7/2004 |
| CN | 1661572 A | 8/2005 |

(Continued)

*Primary Examiner* — Hua J Song
(74) *Attorney, Agent, or Firm* — Wayne & Ken, LLC; Tony Hom

(57) ABSTRACT

A loading control method and system for a storage device are disclosed. The method includes: judging whether a storage controller is valid through a first bus, and judging whether a storage controller is valid through a first bus, and acquiring a key of the storage controller if a positive judgement is made; judging whether the key is valid, commanding the storage controller to turn on a power supply of a storage device if a positive judgement is made; and loading the storage device through a second bus. According to the method, storage devices based on windows and android systems are allowed to be loaded after the verification of storage devices is successful. The method protects data security of a user can be effectively and provides reliable and effective protection for future private cloud service data.

3 Claims, 2 Drawing Sheets

(51) Int. Cl.
  *G06F 21/44*   (2013.01)
  *G06F 13/364*  (2006.01)
  *G06F 13/42*   (2006.01)
  *G06F 21/62*   (2013.01)
  *G06F 21/78*   (2013.01)
  *G06F 21/85*   (2013.01)

(52) U.S. Cl.
  CPC .......... *G06F 13/4286* (2013.01); *G06F 21/44* (2013.01); *G06F 21/62* (2013.01); *G06F 21/78* (2013.01); *G06F 21/85* (2013.01); *G06F 2212/1052* (2013.01)

(58) Field of Classification Search
  USPC ......................................................... 711/164
  See application file for complete search history.

(56) References Cited

FOREIGN PATENT DOCUMENTS

| | | |
|---|---|---|
| CN | 101131720 A | 2/2008 |
| CN | 101308475 A | 11/2008 |
| CN | 101441603 A | 5/2009 |
| CN | 101533452 A | 9/2009 |
| CN | 101788959 A | 7/2010 |
| CN | 104636656 A | 5/2015 |

* cited by examiner

LOADING CONTROL METHOD AND SYSTEM STORAGE DEVICE

TECHNICAL FIELD

The present invention relates to secure loading of a storage device, and more specifically, to a loading control method and system for a storage device.

BACKGROUND OF THE INVENTION

Existing storage devices, such as a FLASH memory, a USB flash disk, a mobile hard disk, or a TF card and other related storage devices, have become important devices for data storage in life. However, with the advent of an era of digitalization and intelligence, personal privacy data largely increase.

However, loading of the storage devices can be realized as long as USB communication is successful. Namely, as long as the storage devices, at the time of performing data storage, are directly connected to windows or android systems, the storage devices can be immediately identified and data reading is performed. Thus, controlled loading for certain storage devices that need data encryption or need identification judgment cannot be realized.

SUMMARY OF THE INVENTION

The present invention provides a loading control method and system for a storage device, which can control loading of the storage device to protect storage data.

In order to solve the above problem, as one aspect of the present invention, a loading control method for a storage device is provided. The loading control method includes: judging whether a storage controller is valid through a first bus, and acquiring a key of the storage controller if a positive judgement is made; judging whether the key is valid, commanding the storage controller to turn on a power supply of the storage device if a positive judgement is made; and loading the storage device through a second bus.

Preferably, the step of judging whether a storage controller is valid through a first bus includes: sending a broadcast command to the storage controller through the first bus; acquiring an identity identification information replied by the storage controller; and judging whether the storage controller is valid according to the identity identification information.

Preferably, the step of acquiring a key of the storage controller includes: sending a command to the storage controller through the first bus; and acquiring the key uploaded by the storage controller from the first bus.

Preferably, the step of commanding the storage controller to turn on a power supply of a storage device includes: sending a command to the storage controller through the first bus; waiting for the storage controller to turn on the power supply of the storage device; and identifying and loading the storage device through the second bus.

Preferably, the first bus is an RS485 bus, and the second bus is a USB bus.

The present invention further provides another loading control method for the storage device, including: uploading an identity identification information of a slave device to a master device through a first bus according to a first command from the master device; uploading a key of the slave device to the master device through the first bus according to a second command sent after the master device confirms the identity identification information; and turning on a power supply of the storage device according to a third command sent after the master device confirms the key. So that the storage device can be identified and loaded by the master device through a second bus.

Preferably, the first bus is an RS485 bus, and the second bus is a USB bus.

The present invention further provides a loading control system for a storage device, including: a master device and a slave device. The master device includes a first port and a second port. The slave device includes a third port, a fourth port, a power control system, a storage controller and a storage device. The first port is connected with the third port through the RS485 bus. The second port is connected with the fourth port through the USB bus. The storage controller is connected with the power control system through the third port. The storage device is connected with the fourth port. The master device acquires the identity identification information replied by the storage controller through the RS485 bus to judge whether the slave device is valid. If the slave device is valid, the master device acquires the key from the storage controller through the RS485 bus and judges whether the key is valid. If the key is valid, the master device commands the storage controller through the RS485 bus to control the power control system to power the storage device, so that the master device can load the storage device through the USB bus.

According to the present invention, storage devices based on windows and android systems are allowed to be loaded after the verification of storage devices is successful. The method can effectively protects data security of a user and provides reliable and effective protection for future private cloud service data.

DETAILED DESCRIPTION OF THE INVENTION

Embodiments of the present invention are described below in detail in combination with drawings, but the present invention can be implemented in multiple different modes defined and covered by claims.

Figure 1:
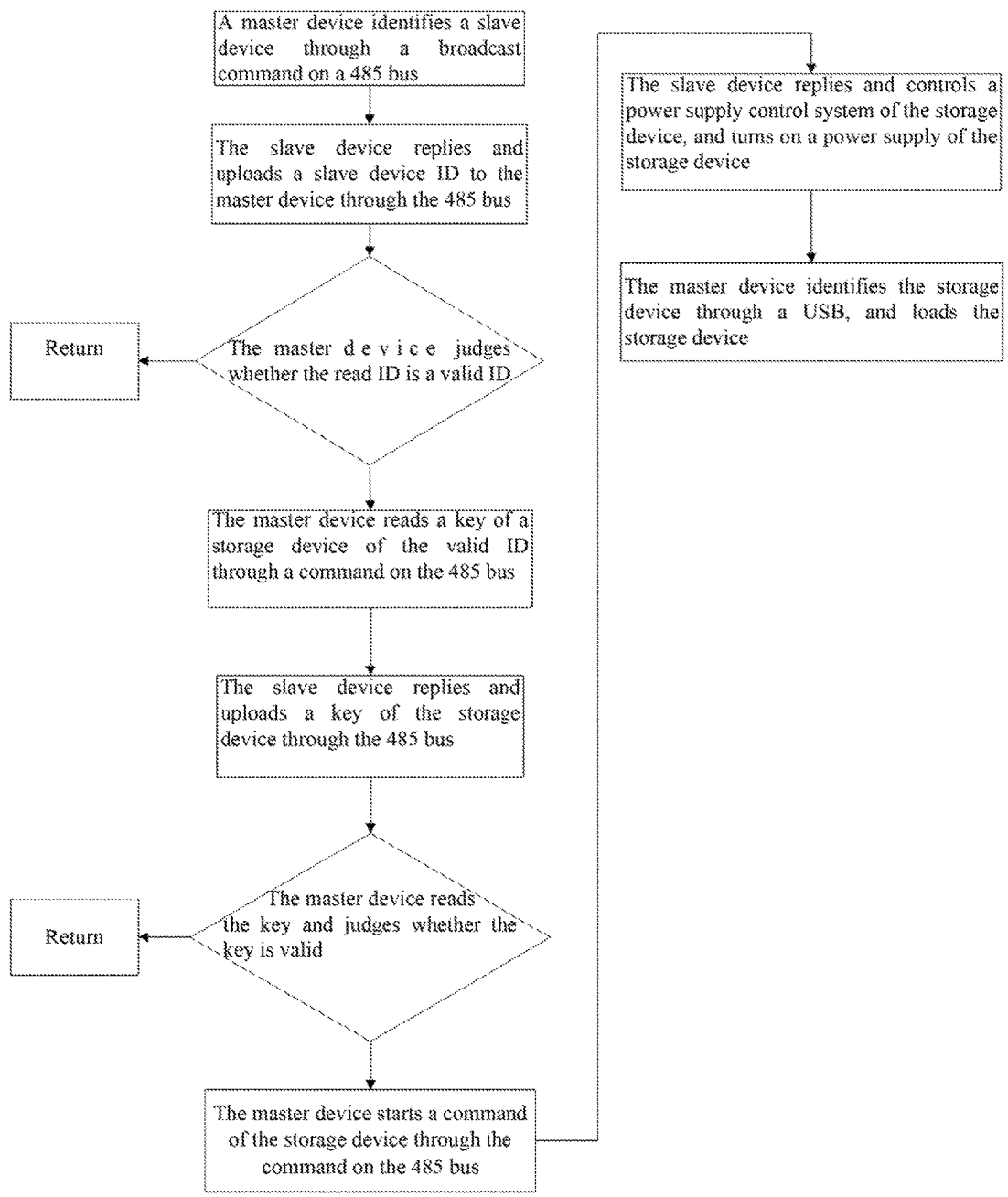
FIG. 1 schematically shows a flow chart of a loading control method for a storage device.

With reference to FIG. 1, the present invention provides a loading control method for a storage device. Specifically, the method in the present embodiment is applicable for a master device. The method includes: judging whether a storage controller is valid through a first bus, and acquiring a key of the storage controller if a positive judgement is made; judging whether the key is valid, commanding the storage controller to turn on a power supply of the storage device if a positive judgement is made; and loading the storage device through a second bus. Preferably, the first bus is an RS485 bus, and the second bus is a USB bus.

As shown in FIG. 1, firstly, the master device is connected with the storage controller of a slave device through the first bus, so as to verify validity of the slave device. Only the slave device that passes the verification of the validity can perform subsequent loading operation. If the slave device is valid, the master device further acquires a key of the slave device to verify whether the key is valid. After the key is verified to be valid, the master device commands the storage controller of the slave device to supply power for the storage device of the slave device through the first bus. Then, the master device can load and access data in the storage device through the second bus independent of the first bus.

Due to the above technical solution, when verification and data access are performed on the slave device in the present invention, two different and independent buses are adopted, so that the storage device is not directly accessed in a verification process. Under a condition that the verification is not successful, the storage device in the slave device is in a non-powered and non-operating state. Even if the master device is connected with the storage device in the slave device through the second bus, since the storage device is not powered, loading and accessing to the storage device cannot be performed. Only valid slave devices that pass the verification can notify the storage controllers in the slave devices to power the storage devices of the slave devices, so that the master device can load and access the storage devices through the second bus.

In this way, according to the present invention, storage devices based on windows and android systems are allowed to be loaded after the verification of storage devices is successful. The method can effectively protects data security of a user and provides reliable and effective protection for future private cloud service data.

Preferably, the step of judging whether a storage controller is valid through a first bus includes: sending a broadcast command to the storage controller through the first bus; acquiring identity identification information replied by the storage controller; and judging whether the storage controller is valid according to the identity identification information.

Preferably, the step of acquiring a key of the storage controller includes: sending a command to the storage controller through the first bus; and acquiring the key uploaded by the storage controller from the first bus.

Preferably, the step of commanding the storage controller to turn on a power supply of a storage device includes: sending a command to the storage controller through the first bus; waiting for the storage controller to turn on the power supply of the storage device; and identifying and loading the storage device through the second bus.

The present invention further provides a loading control method for a storage device. Specifically, the method in the present embodiment is suitable for a slave device end. The method includes: uploading identity identification information of a slave device to a master device through the first bus according to a first command from the master device; uploading a key of the slave device to the master device through the first bus according to a second command sent after the master device confirms the identity identification information; and turning on the power supply of the storage device according to a third command sent after the master device confirms the key. So that the storage device can be identified and loaded by the master device through the second bus. Preferably, the first bus is an RS485 bus, and the second bus is a USB bus.

Due to the above technical solution, when verification and data access are performed on the slave device in the present invention, two different and independent buses are adopted, so that the master device does not directly access the storage device in a verification process. Under a condition that the verification is not successful, the storage device in the slave device is in a non-powered and non-operating state. Even if the master device is connected with the storage device in the slave device through the second bus, since the storage device is not powered, loading and accessing to the storage device cannot be performed. Only valid slave devices that pass the verification can notify the storage controllers in the slave devices to power the storage devices of the slave devices, so that the master device can load and access the storage devices through the second bus.

In this way, according to the present invention, storage devices based on windows and android systems are allowed to be loaded after the verification of storage devices is successful. The method can effectively protects data security of a user and provides reliable and effective protection for future private cloud service data.

Figure 2:
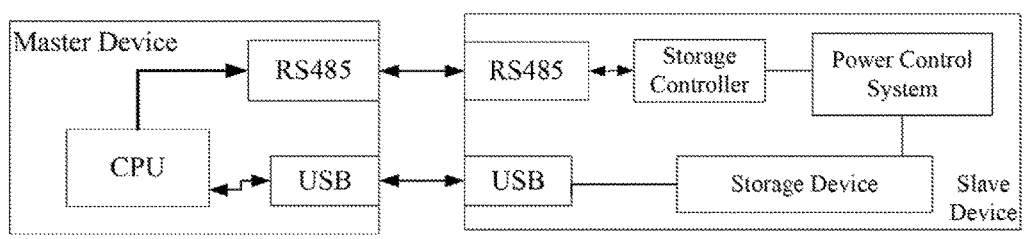
FIG. 2 schematically shows a structural schematic diagram of a loading control system for a storage device.

With reference to FIG. 2, the present invention further provides a loading control system for the storage device, including: a master device and a slave device. The master device includes a first port and a second port. The slave device includes a third port, a fourth port, a power control system, a storage controller and a storage device. The first port is connected with the third port through the RS485 bus. The second port is connected with the fourth port through the USB bus. The storage controller is connected with the power control system through the third port. The storage device is connected with the fourth port. The master device acquires the identity identification information replied by the storage controller through the RS485 bus to judge whether the slave device is valid. If the slave device is valid, the master device acquires the key from the storage controller through the RS485 bus and judges whether the key is valid. If the key is valid, the master device commands the storage controller through the RS485 bus to control the power control system to power the storage device, so that the master device can load the storage device through the USB bus.

Firstly, a master device is connected with the storage controller of a slave device through the first bus, so as to verify validity of the slave device. Only the slave device that passes the verification of the validity can perform subsequent loading operation. If the slave device is valid, the master device further acquires a key of the slave device to verify whether the key is valid. After the key is verified to be valid, the master device commands the storage controller of the slave device to power the storage device of the slave device through the first bus. Then, the master device can load and access data in the storage device through the second bus independent of the first bus.

In this way, according to the system in the present invention, storage devices based on windows and android systems are allowed to be loaded after the verification of storage devices is successful. The method can effectively protects data security of a user and provides reliable and effective protection for future private cloud service data.

The above only describes preferred embodiments of the present invention, not intended to limit the present invention. For those skilled in the art, various changes and variations can be made to the present invention. Any modification, equivalent replacement, improvement, etc. made within spirits and principles of the present invention shall be included in the protection scope of the present invention.

What is claimed is:

1. A loading control method for a storage device, comprising:
    judging whether a storage controller is valid through a first bus, and acquiring a key of the storage controller if a positive judgement is made;
    judging whether the key is valid, commanding the storage controller to turn on a power supply of the storage device if a positive judgement is made; and
    loading and accessing the storage device through a second bus;

wherein the step of judging whether the storage controller is valid through the first bus further comprises:

sending a broadcast command to the storage controller through the first bus;

acquiring an identity identification information replied by the storage controller; and judging whether the storage controller is valid according to the identity identification information;

wherein the step of commanding the storage controller to turn on the power supply of the storage device further comprises:

sending a command to the storage controller through the first bus; and waiting for the storage controller to turn on the power supply of the storage device.

2. The method according to claim 1, wherein the step of acquiring the key of the storage controller further comprises:

sending a command to the storage controller through the first bus; and acquiring the key uploaded by the storage controller from the first bus.

3. The method according to claim 1, wherein the first bus is an RS485 bus, and the second bus is a USB bus.

* * * * *